(12) United States Patent
Himmelmann

(10) Patent No.: US 8,680,849 B2
(45) Date of Patent: Mar. 25, 2014

(54) SPRING LOADED GEAR DRIVEN RESOLVER

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 493 days.

(21) Appl. No.: 13/037,408

(22) Filed: Mar. 1, 2011

(65) Prior Publication Data

US 2012/0223702 A1    Sep. 6, 2012

(51) Int. Cl.
*G01B 7/30* (2006.01)
*G01P 15/08* (2006.01)

(52) U.S. Cl.
USPC .................................. 324/207.25; 73/514.16

(58) Field of Classification Search
USPC ...................................... 324/207.25
See application file for complete search history.

(56) References Cited

U.S. PATENT DOCUMENTS

| | | | |
|---|---|---|---|
| 3,491,276 A * | 1/1970 | Sager et al. | .................... 318/581 |
| 4,187,455 A | 2/1980 | Martin | |
| 4,678,401 A | 7/1987 | Bradford et al. | |
| 4,893,261 A | 1/1990 | Flint, III et al. | |
| 5,058,853 A | 10/1991 | Beloncik et al. | |
| 7,854,680 B2 | 12/2010 | Sugai et al. | |
| 7,872,440 B2 | 1/2011 | Atarashi et al. | |
| 7,873,487 B2 | 1/2011 | Kobayashi et al. | |
| 7,888,894 B2 | 2/2011 | Sugawara et al. | |
| 7,893,580 B2 | 2/2011 | Kobayashi | |
| 7,893,637 B2 | 2/2011 | Suhama et al. | |

* cited by examiner

*Primary Examiner* — Bot Ledynh
(74) *Attorney, Agent, or Firm* — Cantor Colburn LLP

(57) ABSTRACT

A resolver apparatus can include a resolver driven gear, a resolver stator, a resolver rotor coupled to the resolver stator and a resolver rotor drive shaft coupled to the resolver rotor, wherein the resolver rotor drive shaft is spring loaded to the resolver driven gear.

18 Claims, 4 Drawing Sheets

SPRING LOADED GEAR DRIVEN RESOLVER

BACKGROUND OF THE INVENTION

The subject matter disclosed herein relates to motors, and more particularly to a spring loaded gear driven resolver for bearingless high pole count electric machine.

The automotive industry has implemented permanent magnet (PM) electric machines for vehicle propulsion applications. Permanent magnet motors typically have high efficiency and tolerance to large radial air gaps. In automotive applications, the electric machine has been integrated into the vehicle propulsion system, usually mounted in the driveline between the internal combustion engine and the vehicle transmission. Early in the evolution of this vehicle integration, the electric machine rotor was typically supported by its own dedicated set of rotor support bearings. Since rotor support bearings have a low reliability with respect to other components in a PM electric machine, the automotive industry has started to pursue the use of bearingless PM electric machines to increase the reliability of the electric machine, while also decreasing the cost and complexity of the electric machine. Current electric machines include a position sensor (i.e., a resolver) that is mounted on the rotor shaft between the two rotor support bearings, or at one end of the rotor shaft. The resolver can be packaged into the electric machine this way for two primary reasons. First, placing the resolver at the inside diameter of the electric machine utilized previously unused space, thereby reducing the overall size of the electric machine. Second, resolvers need to maintain precise axial and radial alignments, of their rotors to their stators, in order to control the error of the reported rotor position. By installing the resolver rotor on the electric machine rotor, which is supported by a bearing system, both the axial and the radial position of the resolver rotor are held nearly constant relative to the resolver stator. Low cost commercially available resolvers are designed to be mounted to a reasonably small shaft (<2 inches). In current applications, the shaft torque is sufficiently large to require a shaft diameter that is significantly larger than 2 inches. As such, a higher cost and large diameter resolver is implemented. Current resolvers also have drawbacks because accessing the resolver includes removal of the entire electric machine.

BRIEF DESCRIPTION OF THE INVENTION

Exemplary embodiments include a resolver apparatus, including a resolver driven gear, a resolver stator, a resolver rotor coupled to the resolver stator and a resolver rotor drive shaft coupled to the resolver rotor, wherein the resolver rotor drive shaft is spring loaded to the resolver driven gear.

Additional exemplary embodiments include an engine system, including an engine, a transmission coupled to the engine, a permanent magnet electric machine disposed between the engine and the transmission and a resolver disposed on the permanent magnet electric machine, the resolver including a resolver driven gear, a resolver stator, a resolver rotor coupled to the resolver stator and a resolver rotor drive shaft coupled to the resolver rotor, wherein the resolver rotor drive shaft is spring loaded to the resolver driven gear.

Further exemplary embodiments include an engine system, including an engine, a transmission coupled to the engine, a generator disposed between the engine and the transmission, a rectifier electrically coupled to the generator and a resolver disposed on the generator, the resolver including a resolver driven gear, a resolver drive gear in mesh engagement with the resolver driven gear and coupled to the generator, a resolver stator, a resolver rotor coupled to the resolver stator and a resolver rotor drive shaft coupled to the resolver rotor, wherein the resolver rotor drive shaft is spring loaded to the resolver driven gear.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
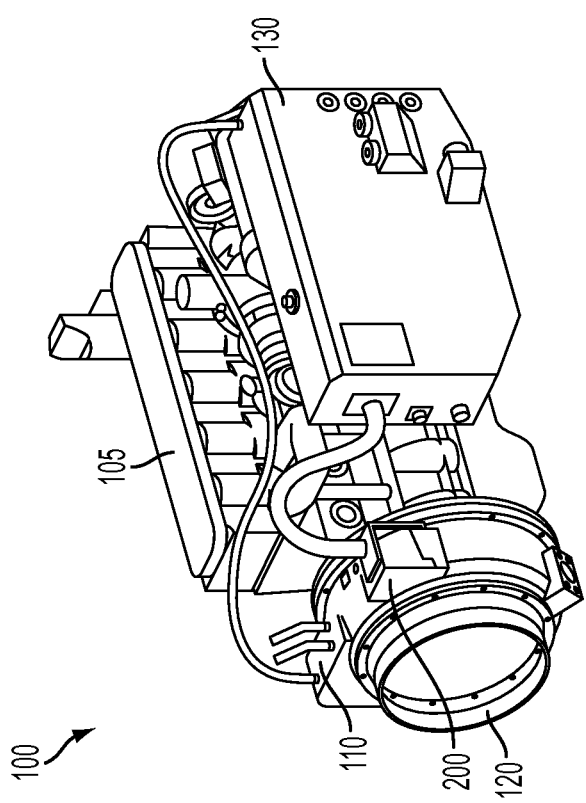
FIG. 1 illustrates a bearingless resolver system in accordance with exemplary embodiments.

FIG. 1 illustrates a bearingless resolver system 100 in accordance with exemplary embodiments. The system 100 includes an engine 105 that can be any internal combustion engine. In other exemplary embodiments, the engine can be any type of electric machine that requires a rotor position sensor. This sensor arrangement could also be used on any type of rotating machine (e.g., turbine, compressor, etc) which has a requirement to sense the rotational position/speed of the rotor, without access to either end of the rotating shaft, and a large diameter shaft, or a shaft that has axial and/or radial displacement. The system 100 also includes a PM electric generator 110, (also referred to as PM electric machine 110), disposed between and coupled to the engine 105 and a transmission 120, only part of which is illustrated. As described herein the PM electric generator 110 is highly efficient, and does not require an electromagnetic (EM) field to be excited because it generates its own EM field constantly from an internal PM (not shown). In order to interact with the engine 105, precise measurements of the rotor system of the PM electric generator 110 are taken. The output of the PM electric generator 110 is rectified in order to adjust to changes in the magnetic field. As such, the system 100 further includes a rectifier 130 coupled to the PM electric machine 110 via an exemplary resolver 200. As described herein, the resolver 200 takes positional measurements of the PM electric motor 110. In order to actively rectify the alternating current waveforms of the PM electric machine 110 (or to drive the PM electric machine 110 as a motor) the resolver 200 is implemented to determine the position of the rotor permanent magnets, relative to the stator poles as described further herein. This relative position is used to control points of commutation of the rectifier 130.

Figure 2:
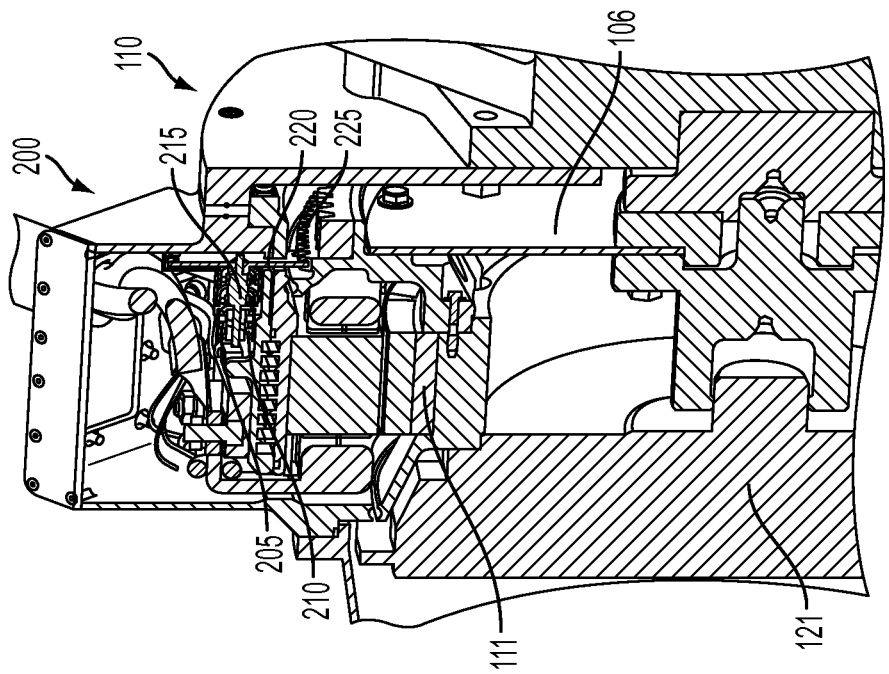
FIG. 2 illustrates an exemplary resolver.

FIG. 2 illustrates the exemplary resolver 200 of FIG. 1. The resolver 200 includes a resolver stator 205 coupled to a resolver rotor 210. The resolver rotor 210 is supported by a resolver rotor drive shaft 215. The resolver 200 further includes a resolver driven gear 220 coupled to the resolver rotor drive shaft 215. The resolver driven gear 220 is in meshed engagement with a resolver drive gear 225. FIG. 2 further illustrates a PM electric machine rotor 111. FIG. 2 further illustrates an engine flex plate 106 and transmission torque converter 121. The engine flex plate 106 is disposed between and coupled the engine 105 and the transmission 120 via the transmission torque converter 121.

Figure 3:
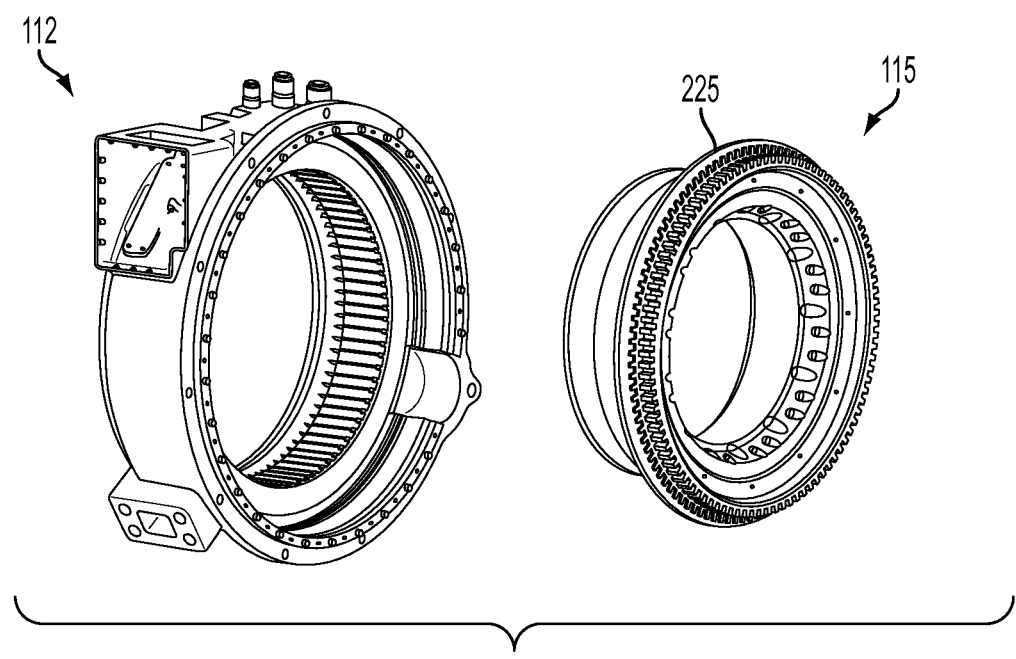
FIG. 3 illustrates an exemplary permanent magnet electric machine stator sub-assembly and a permanent magnet electric machine rotor sub-assembly.

FIG. 3 illustrates a PM electric machine stator sub-assembly 112 and a PM electric machine rotor sub-assembly 115 of the PM electric machine 110. The PM stator sub-assembly 112 is an electro-magnetic assembly that interacts with the PM electric machine rotor subassembly 112. The PM electric machine rotor sub-assembly 115 also includes the resolver drive gear 225, which is an integral component with the PM electric machine rotor sub-assembly 115. As such, the resolver 200 is directly coupled to rotation of the PM electric machine 110. The resolver drive gear 225 thus drives the resolver driven gear 220 so that the resolver 200 can take direct positional measurements of the PM electric machine 110.

Figure 4:
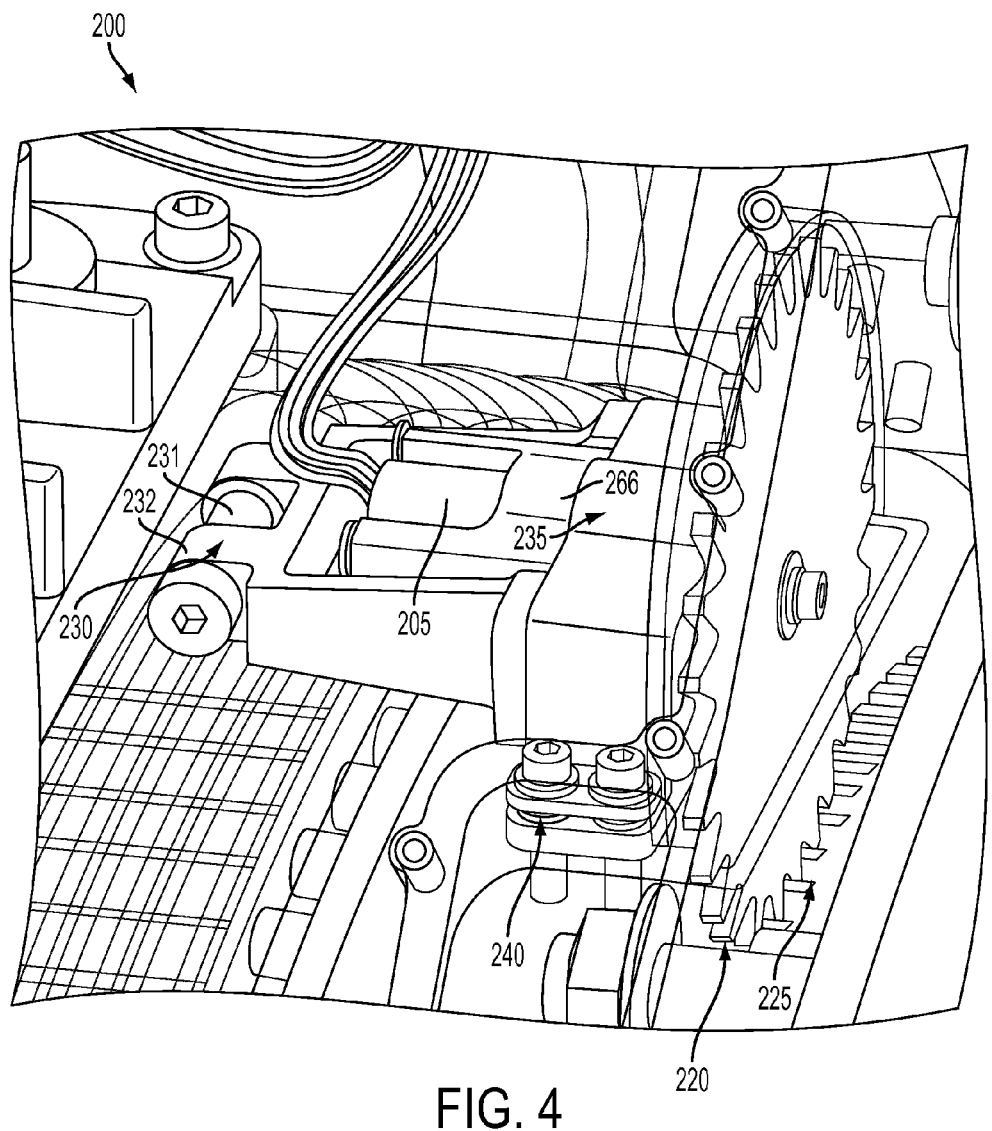
FIG. 4 illustrates a top perspective view of an exemplary resolver.
Figure 5:
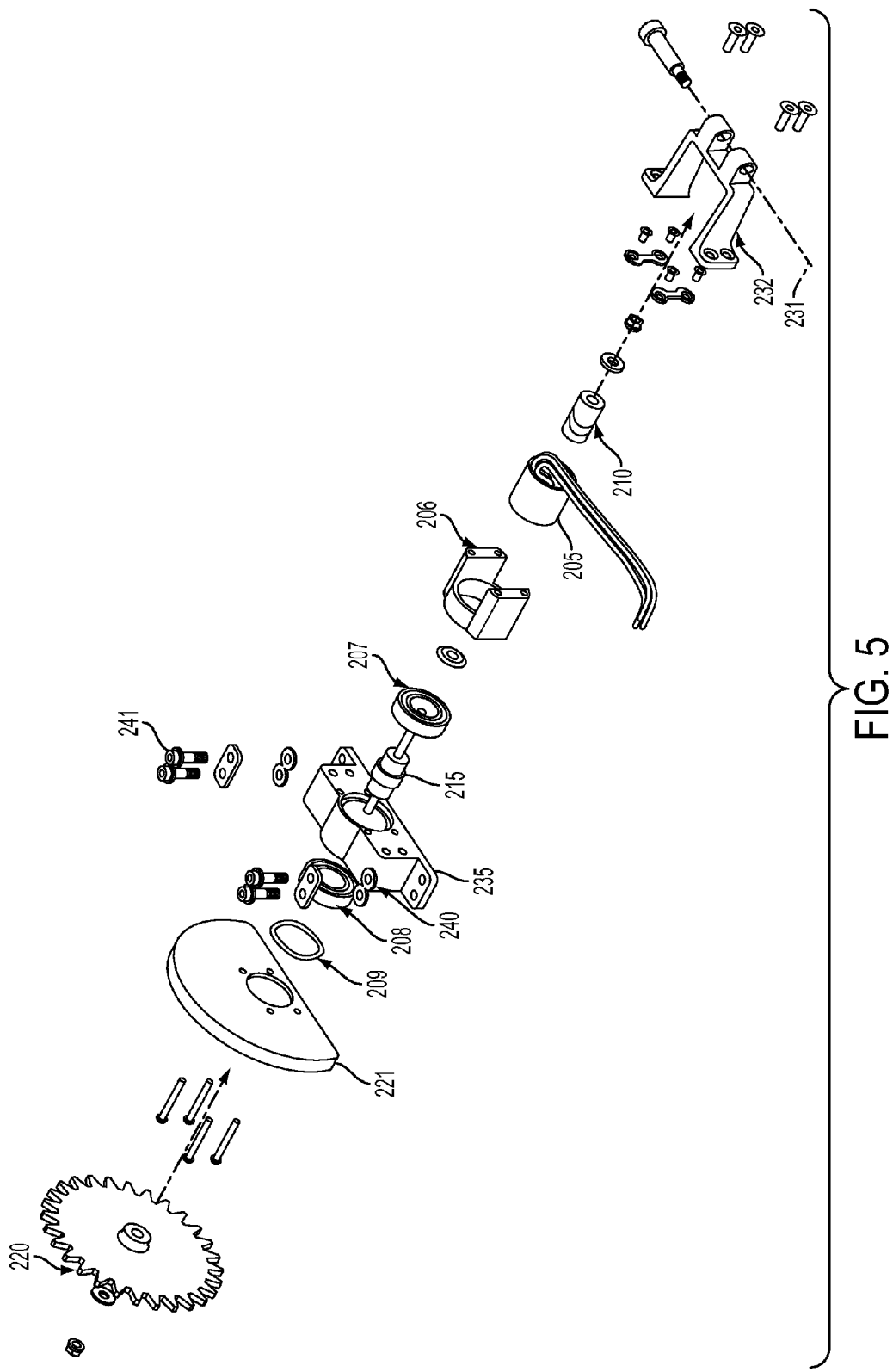
FIG. 5 illustrates an exploded view of components of an exemplary resolver.

FIG. 4 illustrates a top perspective view of the resolver 200 of FIGS. 1 and 2, and FIG. 5 illustrates an exploded view of components of the resolver 200 of FIGS. 1, 2 and 4. It is appreciated that the exploded view of the resolver 200 can include various other bearings and attachment devices (e.g., bolts) that are not illustrated to simplify the discussion. FIGS. 4 and 5 illustrate the resolver driven gear 220 and resolver drive gear 225 as described herein. The resolver driven gear 220 can be housed in a protective gear housing 221. The resolver 200 can further include a resolver pivot assembly 230 that includes a resolver pivot pin 231 and resolver pivot housing 232. The resolver 200 further includes a resolver mount 235 that couples the resolver 200 to the PM electric machine 110. Resolver loading springs 240 couple the resolver mount 235 and the PM electric machine 110. Attachment devices 241 (e.g., bolts) couple the resolver mount 235 to the PM machine 110. The resolver 200 further includes the resolver stator 205 disposed in a stator housing 206 that is coupled to the resolver mount 235 and adjacent the resolver pivot housing 232. The resolver further includes the resolver rotor 210 and the resolver rotor drive shaft 215. A first resolver bearing 207 can be disposed between the stator housing 206 and the resolver mount 235. The resolver 200 can include a second resolver bearing 208 and a bearing load spring 209. When assembled, the resolver rotor drive shaft and bearings 207, 208 reside within the resolver mount 235.

As described herein, the PM electric motor 110 drives the resolver drive gear 225, which in turn drives the resolver driven gear 220. The resolver rotor shaft 215 is supported by the bearings 207, 208 that restrict the motion of the resolver rotor shaft 215 in both the radial, and the axial direction. In exemplary embodiments, the mesh engagement of the resolver driven gear 220 and the resolver drive gear 225 is a spur gear mesh. The spur gear mesh allows the resolver drive gear 225 to move in the axial direction, without forcing the resolver driven gear 220 to move in the axial direction. The spur gear geometry also forces an angular alignment between the electric machine rotor 111 and the resolver rotor shaft 215 to remain constant. The resolver driven gear 220 and the resolver rotor shaft 215 are spring loaded via the bearing load spring 209 to push against the electric machine rotor 111. The spring loaded arrangement forces gear mesh backlash to zero, while accommodating thermal expansions, and electric machine rotor radial displacement. As described herein, the resolver loading springs 240 and attachment devices 241 couple the resolver mount 235 and the PM electric machine 110. The resolver loading springs 240 allow for radial movement of the resolver 200 with respect to the PM electric machine 110. In addition, the resolver 200 can be easily replaced by removal of the attachment devices 241. This feature allows for the quick replacement of the resolver 200 if the resolver 200 becomes faulty, without the need to remove the PM electric machine 110 from the driveline of the engine 105.

The exemplary a bearingless resolver system 100 includes several advantages. As described herein, external mounting of the resolver 200 allows the resolver 200 to be replaced without the need to remove the PM electric machine 110 from the drivelines of the engine 105. A 7:1 gear ratio allows for the use of a two speed resolver to create 14 electrical cycles per revolution of the electric machine, matching the 14 electrical cycles of the electric machine per one mechanical revolution of the PM electric machine 110. This feature allows for the use of a less expensive resolver without sacrificing accuracy. The resolver 200 maintains resolver rotor to stator axial alignment as the electric machine rotor is displaced in both the axial direction and the radial direction. Resolver accuracy is therefore maintained. The spring loaded design maintains zero backlash in the gearing, while allowing for inexpensive gear manufacturing techniques, and while following the radial displacement of the rotor without compromising the resolver accuracy. The resolver 200 is remote to the main electric machine rotor and stator, mitigating resolver related thermal issues.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although described with reference to a PM electric machine, the PM electric machine 110 may represent any rotating machine such as a turbine or compressor, and thus need not be limited to the use of a permanent magnet machine or other type of electric machine. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A resolver apparatus, comprising:
    a resolver driven gear;
    a resolver stator;
    a resolver rotor coupled to the resolver stator; and
    a resolver rotor drive shaft coupled to the resolver rotor, and
    a resolver mount that houses the first and second resolver bearings and the resolver rotor drive shaft;
    wherein the resolver rotor drive shaft is spring loaded to the resolver driven gear:
    wherein the resolver mount is configured to be spring mounted to a permanent magnet (PM) electric machine and the stator housing is configured to be pivotally mounted to the PM electric machine.

2. The apparatus as claimed in claim 1 further comprising a first and a second resolver bearings coupled to the resolver rotor drive shaft.

3. The apparatus as claimed in claim 1 further comprising a spring disposed between the resolver driven gear and the resolver mount.

4. The apparatus as claimed in claim 1 further comprising a stator housing that houses the resolver stator.

5. An engine system, comprising:
    an engine;
    a transmission coupled to the engine;

a permanent magnet (PM) electric machine disposed between the engine and the transmission; and a resolver disposed on the PM electric machine, the resolver including:
   a resolver driven gear;
   a resolver stator;
   a resolver rotor coupled to the resolver stator; and
   a resolver rotor drive shaft coupled to the resolver rotor, wherein the resolver rotor drive shaft is spring loaded to the resolver driven gear.

6. The system as claimed in claim 5 further comprising a rectifier electrically coupled to the PM electric machine.

7. The system as claimed in claim 5 wherein the PM electric machine includes a PM electric machine stator sub-assembly that is electromagnetically coupled to the resolver.

8. The system as claimed in claim 7 herein the resolver further includes a resolver drive gear in mesh engagement with the resolver driven gear.

9. The system as claimed in claim 8 wherein the mesh engagement of the resolver drive gear and the resolver driven gear is a spur gear mesh engagement.

10. The system as claimed in claim 5 further comprising a first and a second resolver bearings coupled to the resolver rotor drive shaft.

11. The system as claimed in claim 10 further comprising a resolver mount that houses the first and second resolver bearings and the resolver rotor drive shaft.

12. The system as claimed in claim 11 further comprising a spring disposed between the resolver driven gear and the resolver mount.

13. The system as claimed in claim 11 further comprising a stator housing that houses the resolver stator.

14. The system as claimed in claim 11 wherein the resolver mount is configured to be spring mounted to the PM electric machine, and the stator housing is configured to be pivotally mounted to the PM electric machine.

15. An engine system, comprising:
   an engine;
   a transmission coupled to the engine;
   a generator disposed between the engine and the transmission;
   a rectifier electrically coupled to the generator; and
   a resolver disposed on the generator, the resolver including:
      a resolver driven gear;
      a resolver drive gear in mesh engagement with the resolver driven gear and coupled to the generator;
      a resolver stator;
      a resolver rotor coupled to the resolver stator; and
      a resolver rotor drive shaft coupled to the resolver rotor, wherein the resolver rotor drive shaft is spring loaded to the resolver driven gear.

16. The system as claimed in claim 15 wherein the generator includes a rotor gear.

17. The system as claimed in claim 16 wherein the resolver drive gear is integral with the rotor gear.

18. The system as claimed in claim 15 wherein the resolver is spring mounted to the generator.

* * * * *